United States Patent
Mönch

(10) Patent No.: US 7,128,441 B2
(45) Date of Patent: Oct. 31, 2006

(54) VIDEO PROJECTION SYSTEM

(75) Inventor: Holger Mönch, Vaals (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 85 days.

(21) Appl. No.: 10/500,504

(22) PCT Filed: Dec. 9, 2002

(86) PCT No.: PCT/IB02/05203

§ 371 (c)(1),
(2), (4) Date: Jun. 29, 2004

(87) PCT Pub. No.: WO03/056841

PCT Pub. Date: Jul. 10, 2003

(65) Prior Publication Data

US 2005/0041160 A1 Feb. 24, 2005

(30) Foreign Application Priority Data

Jan. 2, 2002 (DE) ............................... 102 00 024

(51) Int. Cl.
*F21V 9/00* (2006.01)
(52) U.S. Cl. .................. 362/277; 362/293; 353/84; 348/743
(58) Field of Classification Search ................ 362/269, 362/293; 353/84; 348/743
See application file for complete search history.

(56) References Cited

U.S. PATENT DOCUMENTS

| | | | | |
|---|---|---|---|---|
| 4,800,474 A | * | 1/1989 | Bornhorst | ................... 362/293 |
| 4,899,267 A | * | 2/1990 | Mardon | ...................... 362/277 |
| 5,113,332 A | * | 5/1992 | Richardson | .................. 362/282 |
| 5,680,180 A | * | 10/1997 | Huang | .......................... 348/656 |
| 5,706,061 A | * | 1/1998 | Marshall et al. | ............. 348/743 |
| 5,758,956 A | * | 6/1998 | Bornhorst et al. | .......... 362/294 |
| 5,829,868 A | * | 11/1998 | Hutton | ........................ 362/276 |
| 6,113,252 A | | 9/2000 | Arlitt et al. | |
| 6,379,025 B1 | * | 4/2002 | Mateescu et al. | ............ 362/293 |
| 6,631,996 B1 | * | 10/2003 | Moench et al. | ................ 353/85 |

FOREIGN PATENT DOCUMENTS

| | | |
|---|---|---|
| DE | 3813421 | 11/1989 |
| GB | 2075720 A * | 11/1981 |

* cited by examiner

Primary Examiner—Ali Alavi
Assistant Examiner—Hargobind S. Sawhney

(57) ABSTRACT

The invention relates to a video projection system comprising at least a light source coupled to a reflector for focusing the light beam, a motor-driven color wheel having a plurality of light-transmitting segments, at least some of said segments being dichroic filters for the colors red, green, and blue, while the speed of rotation of said wheel can be modified by a control, a lens system imaging the focused light beam onto a display, a display system comprising at least a display and a display control, and a projection lens, wherein the video projection system has a video projection mode and a lighting mode, and in addition the color wheel is stationary in the lighting mode and at least one segment of the color wheel can be given a defined position in the beam.

14 Claims, 2 Drawing Sheets

VIDEO PROJECTION SYSTEM

The invention relates to a video projection system comprising at least a light source which is coupled to a reflector for forming the light into a beam, a motor-driven color wheel which has several segments, at least some of said segments being dichroic filters for the colors red, green, and blue, and whose speed of rotation can be controllably changed by a control, a lens system which pictures the focused light beam on a display, a display system at least comprising a display and a display control, and a projection lens.

Video projection systems have a construction which is geared in particular to the requirements of the display or displays used.

Video projection systems with several displays, in particular with three displays, and with dichroic filters distinguish themselves by a high efficiency, but they require a high financial investment. This is caused in particular by the expense necessary for the three displays, the high-technology optical system, and the intricate mounting and pixel-critical adjustment of the projection system.

In addition, less expensive projection systems with only a single display are available. These systems usually have a comparatively simple optical system and generate colors sequentially in time in that consecutively a red, a blue, and a green picture are projected. A disadvantage of this projection system is that approximately two thirds of the available quantity of light cannot be utilized owing to the very nature of the method, because only one of the three colors can be used for projection at any given moment. Since this detracts in particular from the brightness of so-termed "white scenes", a certain proportion of white light is transmitted in addition to the three color sequences.

The light beam generated by a conventional light source is often used in a video projection system of the above type in conjunction with a reflector and/or a convergent lens. This focused light beam then hits a rotating color wheel positioned in the path of the beam, which wheel generates the three color sequences. The color wheel rotates in a regular rotation driven by an electric motor at a speed of approximately 3600 to 7200 rpm. The speed of the color change thus generated is regulated and synchronized by the display control. The speed of the color wheel can be changed by a conventional control, for example continuously, if so desired. The speed change of the color wheel takes place in that the color change is synchronized in a usual manner with the image frequency, for example 50 to 60 Hz.

The color wheel has a plurality of segments which are arranged next to one another along the circumference of the color wheel and which enter the light beam one after the other owing to the rotation of the color wheel. Said segments are, for example, dichroic filters for red, green, and blue. If a proportion of "white light" is to be projected in addition, at least one transparent segment is arranged on the color wheel in the same manner.

A lens system which images the focused light beam on the display is the next component arranged in the path of the beam of the video projection system. Apart from the display, the display system comprises at least a display control which realizes inter alia the synchronization of the speed of the color wheel with the image frequency. The light beam leaving the display is incident on a conventional projection lens, so that a projection of moving shapes or videos is realized visible to the human eye. A light source of high luminous intensity is mostly used for video projection systems complying with high optical requirements. Lamp types that can be used for video projection in this respect are, for example, short-arc metal halide gas discharge lamps, xenon high-pressure lamps, and increasingly UHP (ultra high performance) lamps.

Inexpensive projection systems with rotating color wheels and only a single display can in principle be operated not only in an operational video projection mode but also in a lighting mode, i.e. a light beam is emitted for lighting purposes, for example as with a conventional spotlight. If a conventional color-sequence video projection system is to be used for illumination with red light, the display is to be switched to "dark" with respect to the green and blue, and possibly the white sequences, so that these sequences do not contribute to the illumination. In this lighting mode, color-sequence video projection systems do not achieve the brightness of a spotlight having a comparable light source.

In addition, spotlights are known for fulfilling high requirements in the fields of stage, sports, and disco lighting. More recent spotlights tend to resemble the described video projection systems as regards their technical construction, for example the electronic control of the motors, the color wheels, diaphragm and lens systems, and their application, for example the projection of still images. Such a spotlight is known from U.S. Pat. No. 6,113,252. The spotlight described therein has a lamp as its light source. The light of this lamp is formed into a beam by a reflector, is homogenized by a multiple-lens integrator, and is used for illuminating a diaphragm which is imaged on the scene to be illuminated. Said diaphragm can be regularly exchanged by a motor and may have special shapes, for example generating still images. Multi-color wheels are arranged in the path of the beam, capable of generating any mixed colors desired, depending on their position. To enlarge the color space that can be displayed, several such color wheels are positioned one after the other in the beam path. The projection of moving images and videos is not possible with the known spotlights.

It is an object of the invention to provide a video projection system with a display which in its lighting mode has the properties of a spotlight with a comparable light source, in particular as regards the brightness of the radiated light, and which operates efficiently.

The object of the invention is achieved in that the color wheel is stationary in the lighting mode, at least one segment of the color wheel can be given a defined position in the beam path, and the display can be switched at least partly to "bright" by the display control.

The rotating color wheel is brought to a standstill upon the transition from the video projection mode to the lighting mode. The defined positioning of the color wheel in the beam path may be realized in the course of decelerating and stopping of the color wheel or starting from the stationary position. In the technically simplest case, this requires merely a change in the control of the motor in combination with conventional methods and/or known devices for positioning a wheel driven by a shaft.

The solution according to the invention provides a video projection system with only one display which in its operational functions combines the primary properties of a conventional projection system in the video projection mode with those of a fully fledged spotlight in the lighting mode. The multifunctional applications in the video projection and lighting modes of the new system thus achieved enable in particular the professional users to achieve the known advantages of so-termed "combination devices" such as, for example, a reduced investment and maintenance cost compared with the two systems necessary until now for achieving the same functions and quality, without a significant reduction in performance having to be taken into the bargain.

A defined positioning of the color wheel or at least of a segment in the beam will always be such within the scope of the invention that at least part of the light beam passes through the color wheel in its beam.

Displays within the scope of the invention are all known electronic displays that can be used at present for video projection. These displays render possible two switching modes, i.e. "bright", i.e. light may pass through, and "dark", i.e. no light can pass through. They may also represent continuous grey levels. The displays are, for example, sequential LCDs (Liquid Crystal Displays) or a DMD (Digital Micromirror Device) system from the company of Texas Instruments Inc., which are particularly suitable for use of the video projection systems according to the invention in the higher luminous flux ranges.

Display systems comprise besides the displays as their core elements all known components and interfaces known in this connection which are necessary for satisfactory operation and external and/or internal communication, for example for synchronizing the color wheel speed with the image frequency.

Light sources capable of providing high luminous fluxes are in particular xenon high-pressure lamps and increasingly UHP (ultra high performance) lamps (DE 38 134 21). UHP lamps can operate with arc lengths below 2 mm and as a result have a very high efficiency in optical systems. Apart from fulfilling the brightness criterion and that of being as point-shaped a light source as possible, this lamp type provides the properties aimed at in video projection systems, i.e. a good spectral light distribution and constancy of properties throughout the entire, long lamp life.

The invention is advantageously embodied in, inter alia, a video system which displays a sequence of images when it is in the lighting mode as well as the other, further embodiments of the invention set forth herein.

A further advantageous embodiment of the invention relates to the generation of desired mixed colors, for which the color wheel can be positioned in the lighting mode in such a manner that the focused light beam is incident on two dichroic filters of the color wheel. Positioning of the color wheel, and thus of a portion of the color wheel in the beam in the manner indicated above causes the light beam to be incident on two mutually adjoining dichroic filters of the color wheel, whereby a mixed color is generated.

The general color theory teaches that mixing of the so-termed chromatic colors red, green, and blue leads to the known mixed colors, in contrast to non-chromatic such as white, grey, and black. The chrominance is the characteristic of all chromatic colors. The degree to which the chrominance prevails determines the saturation of a chromatic color. Each color has a brightness. Each color can be measured and unequivocally described by means of these three characteristics.

It is furthermore preferred that the color wheel used has at least one transparent segment in addition to the red, green, and blue segments. The known advantages can be achieved thereby in the video projection mode. If the focused light beam is exclusively incident on a transparent segment in the lighting mode, only "white light" will be projected. Colors of different saturation can be generated in that the light beam is incident on a transparent segment and a dichroic filter.

Particularly advantageous is the use of a color wheel having eight segments, six of these segments being dichroic filters for the colors red, green, and blue, and two segments being transparent, which eight segments are arranged immediately next to one another over the circumference of the color wheel in the sequence: red, green, blue, transparent, green, red, blue, transparent. This irregular arrangement of the eight segments, in which each segment occurs twice, increases the number of mixed colors and colors of different saturation that can be generated in a simple manner. The display control must take into account this sequence of the eight segments in an appropriate manner in the video projection mode.

The following embodiments of the invention are regarded as preferred, alternatively or jointly, for achieving a defined positioning of the color wheel: a detection arrangement, an electronically commutated motor, and/or sensors for color measurement.

Such a detection arrangement ("photoelectric barrier") senses the marks provided on the color wheel outside the portions of the color wheel utilized for the passage of the light beam. The position of the color wheel is changed on the basis of a simple control loop until the signal detected by the photoelectric barrier corresponds to the given required value. In the simplest case, marks of different sizes in the positions corresponding to the respective colors will suffice.

The use of an electronically commutated motor as a drive renders a very accurate positioning possible on account of its control. An associated circuit converts the required value, corresponding to the respective color, into the required motor position. In addition, three sensors sensitive to the primary colors can measure the actual color value of the generated light beam. A feedback circuit which has access to the stored data of the color structure of the respective color wheel moves the color wheel until the desired color has been adjusted.

The degree of homogeneity of the focused light beam may be improved by arranging an integrating rod in the beam between the color wheel and the lens system. This arrangement is particularly effective in the generation of mixed colors. Multiple internal reflections mix the input light beam such that a homogeneous illumination with the mixed color is achieved at the output side of the integrating rod.

The use of a color wheel on which a lithographically structured, dichroic filter is arranged is also preferred. The filters are mechanically interconnected on the color wheels widely used nowadays, so that their interconnection locations often have edges which may interfere with the desired beam. Such interferences can be eliminated to the highest degree possible by means of a lithographically structured, dichroic filter which may be arranged, for example, on a highly heat-resistant glass (hard glass). A filter of the type described also contributes to as little light as possible being absorbed in the lighting mode.

If it should be possible to display all colors or mixed colors obtainable on the basis of the colors red, blue, and green, it is preferred that a total number of dichroic filters for red, green, and blue is arranged on one color wheel or on several color wheels such that each of these three colors is arranged directly next to one of the two other colors at least once, and in addition each of these three colors is arranged next to a transparent segment at least once.

The provision of a second color wheel or further color wheels in the beam renders it possible to widen the range of obtainable colors, i.e. mixed colors, further.

The invention will be explained in more detail below with reference to an embodiment, as shown in the drawings, in which.

The video projection systems according to the invention with only one display can be operated with a high efficiency both in the video mode and in the lighting mode. The video projection system has a known, comparatively simple optical system which renders it possible to project the colors generated in a time sequence one after the other. The light beam generated by a conventional light source, for example a UHP lamp, is focused by a reflector in the video projection system. This focused light beam then hits a rotating color wheel 1 in FIG. 1 which is arranged in the beam and which generates in particular the three color sequences. The color wheel 1 is driven into rotation by an electric motor with a speed of approximately 3600 to 7200 rpm, but alternative speed ranges may also be possible. The speed of the color change thus generated and the sequence of the eight segments 2 on the color wheel 1 are synchronized by the display control. The speed of the color wheel 1 is adapted by a conventional, continuous control of the image frequency.

Figure 1:
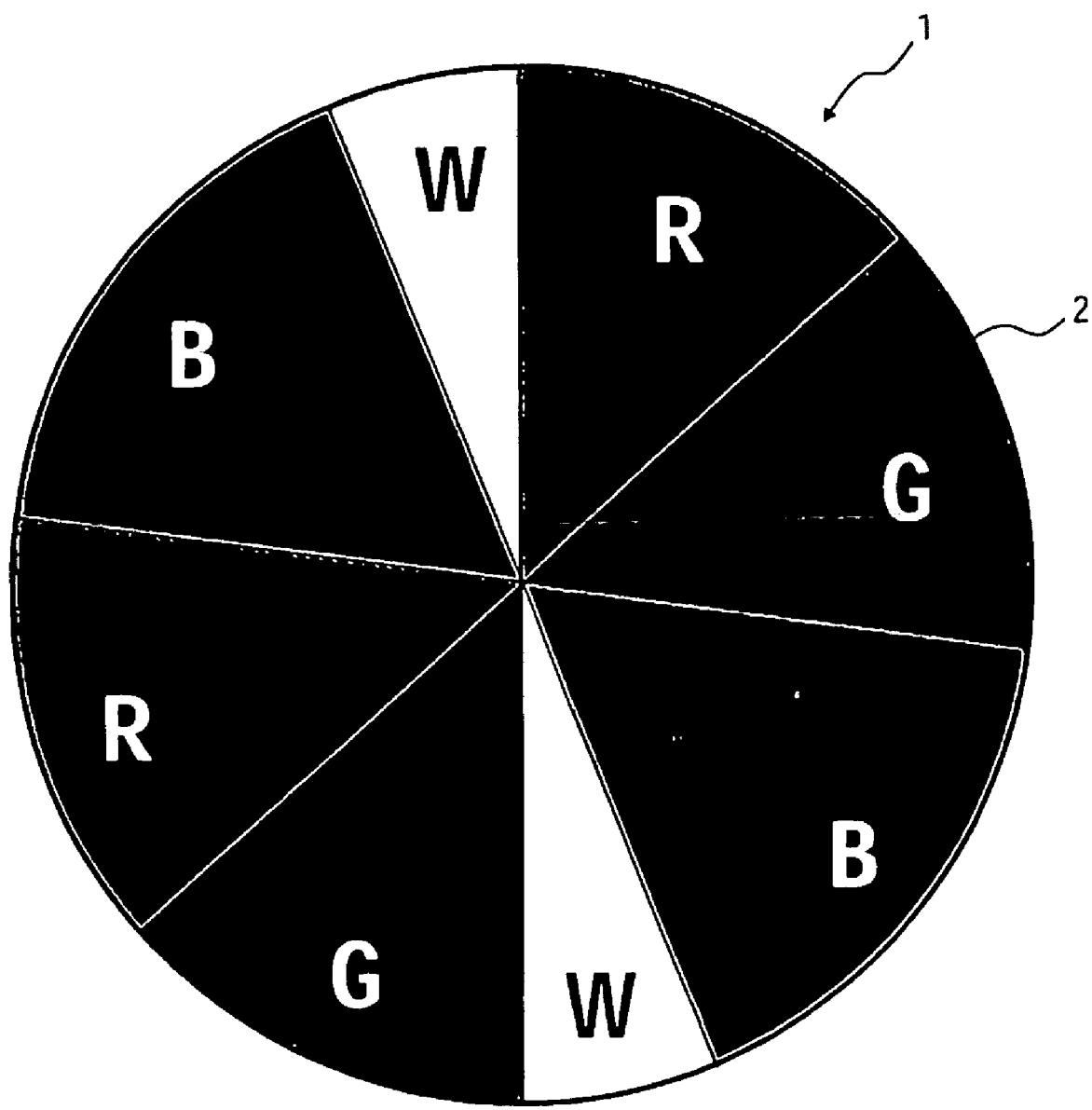
FIG. 1 shows the arrangement of segments on a color wheel.

FIG. 1 diagrammatically shows the arrangement of the segments 2 on the color wheel 1, which has eight segments 2 which are distributed next to one another over the circumference of the color wheel 1 and which enter the beam one by one owing to the rotation of the color wheel 1. Six segments 2 are dichroic filters for red R, green G, and blue B. Two transparent segments 2 are arranged on the color wheel 1 for projecting "white light". The sequence of the colors that can be generated is in clockwise direction: red R, green G, blue B, "white" W, green G, red R, blue B, and "white" W.

Figure 2:
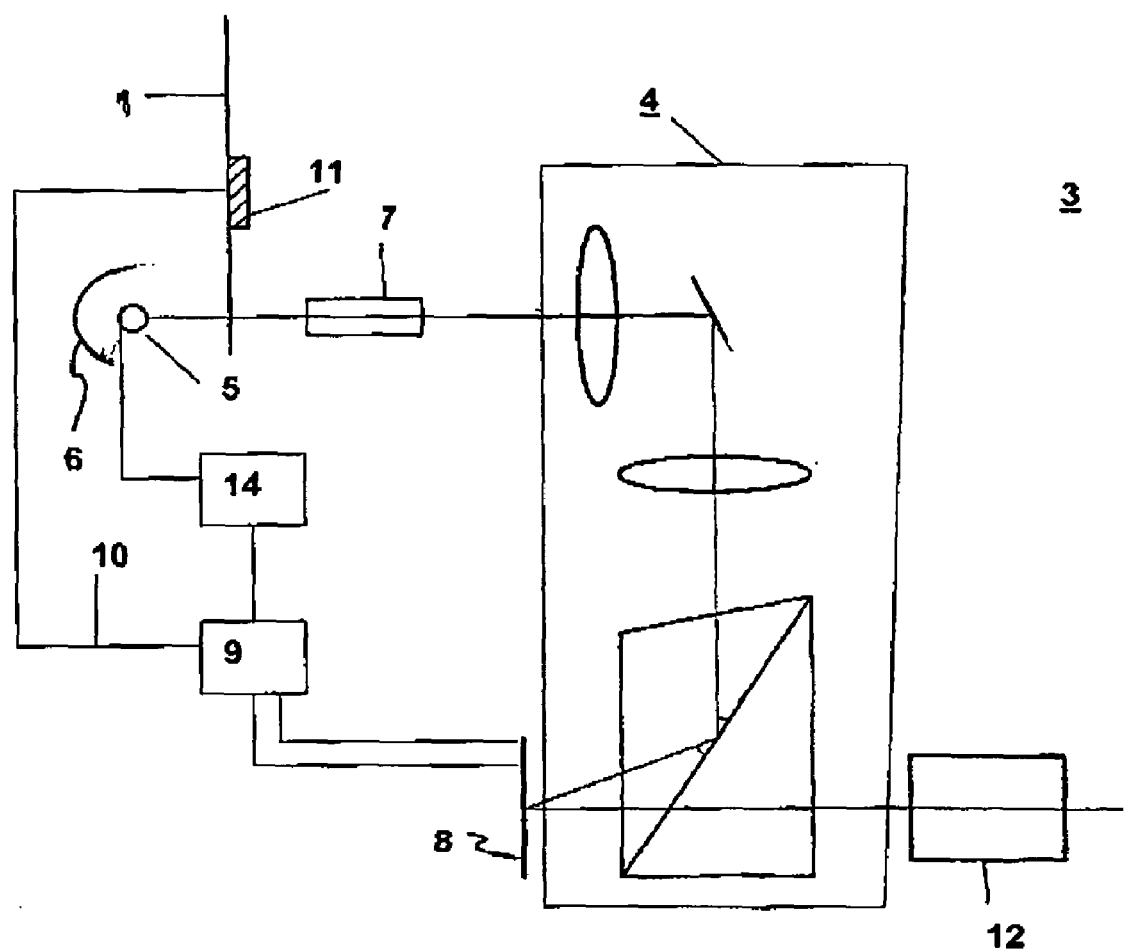
FIG. 2 is a diagram of an exemplary video projection system.

FIG. 2 diagrammatically shows an arrangement of a video projection system The light beam generated by a light source 5 is focused by a reflector 6 in the video projection system 3. The degree of homogenization of the focused light beam is improved through the arrangement of an integrating rod 7 in the beam between the color wheel 1 and a lens system 4. Multiple internal reflections mix the input light beam such that a homogeneous illumination is obtained at the output side of the integrating rod 7. Downstream thereof, the lens system 4 is arranged in the beam of the video projection system 3, imaging the focused light beam onto the DMD display 8. The lens system 3 may comprise lens(es), prism(s) and other components, as it known to one of ordinary skill in the art. The display system comprises besides the display 8 at least a display control 9 which realizes, inter alia, the synchronization of the color change with the image frequency. The display control 9 here gives a signal 10 which leads to the synchronization of the speed of the motor (11)-driven color wheel 1. A lamp power supply 14 is connected to the lamp 5 and to the display control 9. The lamp power supply 14 feeds power to the lamp 5 synchronized with the display 8 and the color wheel 1, as is known to one of ordinary skill in the art. The light beam leaving the display 8 is incident on a conventional projection lens 12, so that a projection of moving shapes or videos visible to the human eye is realized. The projection systems with rotating color wheels and only a single display, which are inexpensive compared with a system having three displays, may be operated as effectively in the lighting mode, for example as a conventional spotlight. If the color-sequence video projection system is to be used for illumination with red light, the display is to be switched correspondingly, and the color wheel is to be held stationary in a position such that the focused light beam is incident only on a dichroic filter for the color red. While the present invention has been described in particular detail with reference to specific exemplary embodiments thereof, it should also be appreciated that, as is known to one of skill in the art, numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

If a certain shape is to be illuminated, for example, or a text character or a sample, also denoted "gobo", is to be represented in a certain color, the shape to be illuminated is shown on the display, and the color chosen for the illumination is adjusted in that the color wheel is positioned.

In this operating mode, accordingly, the video projection system achieves a brightness comparable to that of a spotlight having a light source of the same strength.

The invention claimed is:

1. A video projection system comprising at least a light source coupled to a reflector configured to concentrate the light into a beam,
   a motor-driven color wheel positioned to receive the beam, the motor-driven color wheel having plurality of light-transmitting segments, at least some of said segments being dichroic filters for the colors red, green, and blue, the color wheel being rotatable and having a rotation modifiable by a control,
   a lens system configured to images the beam onto a display,
   a display system comprising at least the display and a display control, and
   a projection lens positioned to receive the beam from the display, wherein said video projection system has not only a video projection mode but also a lighting mode, and wherein the video projection system comprises means for rendering the color wheel stationary with at least one segment of the color wheel at a defined position in the beam path, when the video projection system is in the lighting mode.

2. The video projection system of claim 1, wherein the display is configured to display a sequence of images on the display when the video projection system is in the lighting mode.

3. The video projection system of claim 1, wherein the color wheel can be positioned in the lighting mode such that the beam from the reflector is incident on one or on two dichroic filters of the color wheel.

4. The video projection system of claim 1, wherein the color wheel has at least one clear colorless segment.

5. The video projection system of claim 1, wherein the color wheel has eight segments, of which six segments are dichroic filters for red (R), green (G), and blue (B), and two segments are clear colorless (W), which eight segments are arranged directly next to one another along the circumference of the color wheel in the sequence: red (R), green (G), blue (B), transparent (W), green (G), red (R), blue (B), and transparent (W).

6. The video projection system of claim 1, wherein the means for rendering the color wheel stationary comprises at least one of a detection arrangement, an electronically commutated motor, or sensors for color measurement.

7. The video projection system of claim 1, wherein an integrating rod is arranged in the beam between the color wheel and the lens system.

8. The video projection system of claim 1, wherein a lithographically structured dichroic filter is arranged on the color wheel.

9. The video projection system of claim 1, wherein at least a second color wheel is positioned in the beam.

10. The video projection system of claim 1, wherein dichroic filters for red, green, and blue are arranged on one color wheel or on several color wheels such that overall each of these three colors is arranged directly next to one of the two other colors at least once, and each of theee three colors is arranged next to a transparent segment at least once.

11. The video projection system of claim 1, wherein the projection system is configured for as a spotlight.

12. A video projection system comprising at least a light source coupled to means for concentrating light from the light source into a beam,
- a motor-driven color wheel positioned to receive the beam, the motor-driven color wheel having a plurality of light-transmitting segments, at least some of said segments being dichroic filters for colors, the color wheel being rotatable and having a rotation modifiable by a control,
- a lens system configured to image the beam onto a display,
- a display system comprising at least the display and a display control, and
- a projection lens positioned to receive the beam from the display, wherein said video projection system has not only a video projection mode but also a lighting mode, and wherein the video projection system comprises means for rendering the color wheel stationary with at least one segment of the color wheel) at a defined position in the beam path, when the video projection system is in the lighting mode.

13. The video projection system of claim 12, wherein the means for concentrating light is a reflector.

14. The video projection system of claim 12, wherein the means for concentrating light is a convergent lens.

* * * * *